United States Patent Office 3,572,171
Patented Mar. 23, 1971

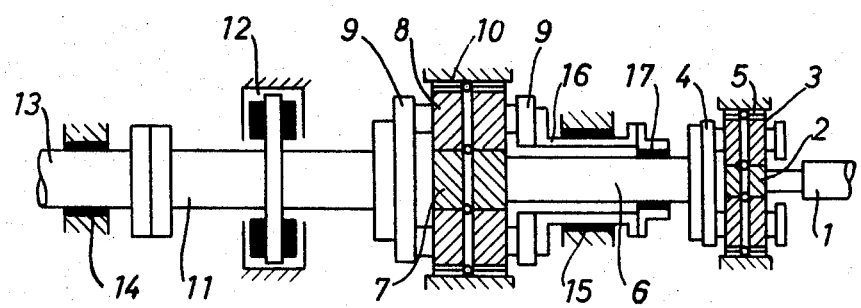

3,572,171
GEAR TRAIN WITH TWO EPICYCLIC GEARS CONNECTED IN SERIES
Per-Erik Arne Larsson, Finspong, Sweden, assignor to Stal-Laval Turbin AB, Finspong, Sweden
Filed Mar. 26, 1969, Ser. No. 810,520
Claims priority, application Sweden, Apr. 18, 1968, 5,161/68
Int. Cl. F16h 1/46, 1/48
U.S. Cl. 74—801                              1 Claim

ABSTRACT OF THE DISCLOSURE

A gear train particularly adapted for marine propulsion machinery and wherein said train is in two stages of epicyclic gearing connected in series. The first stage connects by a shaft to the sun wheel of the second stage. The second stage has a planet carrier supported by a journal bearing located between the two gearing stages, said bearing being disposed around the shaft that bears the sun wheel of the second stage. Another bearing encircles said shaft, the latter bearing being located between the journal bearing and the gearing that constitutes the first stage.

---

This invention relates to a gear train in two stages with two epicyclic gears connected in series, primarily for marine propulsion machinery. The planet carrier of the first stage gear train is solidly connected, by means of a shaft, to the sun wheel of the second stage gear train. It is usual to provide a tooth coupling between the planet carrier and the sun wheel to avoid any misalignment and if appreciable misalignment is anticipated, the coupling must be made of large diameter and with a narrow tooth width. If the tooth coupling is to transmit a high torque, the tooth width has to be wide and therefore accurate alignment is necessary. If the gear train is fitted in a ship, consideration must be given to any distortion of the hull, which will cause the bearing foundations to move, Consequently, the tooth coupling must be made relatively long.

It is also usual with two epicyclic gears connected in series, to make one of these gears with a stationary planet carrier and to connect the inner gear ring with the sun wheel of the other gear. In such case a tooth coupling must also be provided for the transmission of high torque.

With a gear arrangement made in accordance with the present invention, the use of rotating tooth couplings can be avoided even for the transmission of high torques. The machinery will therefore be shorter and the epicyclic gears will not be affected by misalignment of the foundation. In addition, the alignment of the bearings need not be extremely accurate.

The invention is illustrated in the accompanying drawing which shows a longitudinal section through a gear train for marine propulsion machinery and made according to the present invention.

Referring to the drawing, there is therein shown at 1, a shaft which is connected to the propulsion machinery that is not shown in the drawing. The shaft 1 is connected to the sun wheel 2 of the first stage epicyclic gearing shown at the right in the figure of the drawing. The planet wheels 3 of this stage are mounted on a planet carrier 4 and are in mesh with a planet gear ring shown at 5.

The planet carrier 4 is rigidly connected by means of a shaft 6 to a sun wheel 7 of the second stage epicyclic gearing shown in the center of the figure of the drawing. The planet wheels 8 of this stage are mounted on a planet carrier 9 and are in mesh with a fixed planet gear ring 10. The planet carrier 9 is rigidly connected to a thrust bearing shaft 11 which is mounted in a thrust bearing 12. The shaft 11 is connected to another shaft 13 which is connected to the propeller shaft and is supported in a journal bearing 14.

The planet carrier 9 of the second stage gear train is supported between the gear trains by a journal bearing 15 by means of a tubular shaft 16 which surrounds the shaft 6. A bearing 17, located longitudinally between the journal bearing 15 and the first stage gear train, is provided between the shaft 6 and the tubular shaft 16.

The alignment of the bearing 17 has an influence on the distribution of tooth loading at the engagement of the sun wheel. The need for accurate alignment can be reduced by the flexibility provided by the arrangement consisting of the shaft 6 being supported by the bearing 17 which is displaced from sun wheel 7. This flexibility also absorbs misalignment within the gearing.

Instead of making the sun wheel 7 and the shaft 6 integral or in one piece as shown in the drawing, the components may be connected by splines. This type of coupling will not be exposed to uneven loading since the shaft 6 is maintained in concentricity by the bearing 17.

This arrangement of gearing is also applicable to stepping up of the speed from a lower to a higher value.

What is claimed is:
1. A two-stage gearing construction comprising, two planetary gearings connected in series, the planetary carrier of the first stage gearing being fixed by means of an axle to a sun wheel of the second stage gearing, the planetary carrier of the second stage gearing being journalled in a bearing located between the gearings, by means of a tubular shaft which surrounds the shaft of the planet carrier for the first stage gearing and the shaft of the sun wheel, characterized by the fact that between the said shaft of the planet carrier for the first stage gearing and the tubular shaft, there is located a bearing axially arranged between the bearing for the planetary carrier of the second stage gearing and the first stage gearing.

References Cited

UNITED STATES PATENTS

| | | | |
|---|---|---|---|
| 1,551,565 | 9/1925 | Hodgkinson | 74—410 |
| 2,033,749 | 3/1936 | Walter | 74—801X |
| 2,043,261 | 6/1936 | Neuland | 74—801 |
| 3,244,020 | 4/1966 | Breuer | 74—411 |

FOREIGN PATENTS

| | | | |
|---|---|---|---|
| 508,178 | 6/1939 | Great Britain | 74—801 |

CARLTON R. CROYLE, Primary Examiner
T. C. PERRY, Assistant Examiner

U.S. Cl. X.R.
74—410